(12) United States Patent
Aspenson et al.

(10) Patent No.: US 12,305,384 B2
(45) Date of Patent: May 20, 2025

(54) BUILDING INSULATION SYSTEM

(71) Applicant: Mark A. Aspenson, Waterloo, IA (US)

(72) Inventors: Mark A. Aspenson, Waterloo, IA (US); John G. Connell, Tallahassee, FL (US)

(*) Notice: Subject to any disclaimer, the term of this patent is extended or adjusted under 35 U.S.C. 154(b) by 335 days.

(21) Appl. No.: 16/599,619

(22) Filed: Oct. 11, 2019

(65) Prior Publication Data
US 2020/0040569 A1 Feb. 6, 2020

Related U.S. Application Data

(63) Continuation-in-part of application No. 16/291,853, filed on Mar. 4, 2019, now abandoned, which is a continuation of application No. 13/652,442, filed on Oct. 15, 2012, now abandoned.

(60) Provisional application No. 61/548,099, filed on Oct. 17, 2011.

(51) Int. Cl.
E04B 1/78 (2006.01)
E04B 1/76 (2006.01)
E04B 1/74 (2006.01)

(52) U.S. Cl.
CPC ............ E04B 1/7604 (2013.01); E04B 1/78 (2013.01); E04B 2001/746 (2013.01); E04B 2001/7691 (2013.01); Y02A 30/244 (2018.01)

(58) Field of Classification Search
CPC .................................................. Y02A 30/244
USPC ......................................................... 383/211
See application file for complete search history.

(56) References Cited

U.S. PATENT DOCUMENTS

| | | | | |
|---|---|---|---|---|
| 1,637,497 A | * | 8/1927 | O'Dowd | E04C 2/18 428/56 |
| 1,927,879 A | * | 9/1933 | Spafford | E04C 2/18 428/74 |
| 2,028,253 A | * | 1/1936 | Spafford | E04B 1/767 428/126 |
| 2,330,941 A | * | 10/1943 | Acuff, Jr. | 52/407.1 |
| 2,335,220 A | * | 11/1943 | Edwards | 428/104 |
| 2,342,839 A | * | 2/1944 | Byers | 428/126 |
| 2,576,698 A | * | 11/1951 | Russum | F01B 17/04 428/75 |
| 2,700,633 A | * | 1/1955 | Bovenkerk | F17C 13/001 156/82 |

(Continued)

FOREIGN PATENT DOCUMENTS

WO 2007/118321 A2 10/2007

OTHER PUBLICATIONS

Katipamula, Srinivas et al., An Evaluation of the Placement of Radiant Barriers on Their Effectiveness in Reducing Heat Transfer in Attics; Proceedings of the Third Symposium on Improving Building Systems in Hot and Humid Climates; Arlington, TX, Nov. 18-19, 1986; pp. 68-76.

(Continued)

*Primary Examiner* — Peter N Helvey
(74) *Attorney, Agent, or Firm* — ZarleyConley PLC

(57) ABSTRACT

The building insulation system includes a reflective, non-porous bag filled with thermal insulation material. The covering of the bag is made from reflective polymeric facer or plastic, which facilitates reflection of thermal energy radiation. The reflective non-porous bag provides a thermal barrier for conduction, convection and radiation aspects of thermal energy transfer.

7 Claims, 7 Drawing Sheets

(56) References Cited

U.S. PATENT DOCUMENTS

| | | | | |
|---|---|---|---|---|
| 2,742,385 A * | 4/1956 | Bovenkerk | F25D 23/065 | 428/74 |
| 2,779,066 A * | 1/1957 | Gaugler | F25D 23/06 | 312/406 |
| 2,817,123 A * | 12/1957 | Jacobs | F25D 23/06 | 52/406.2 |
| 2,863,179 A * | 12/1958 | Gaugler | F25D 23/06 | 52/406.2 |
| 2,913,104 A * | 11/1959 | Parker | E04B 1/767 | 206/321 |
| 2,998,337 A * | 8/1961 | Tillotson | E04B 1/80 | 52/406.1 |
| 3,003,902 A * | 10/1961 | Mcduff | E04C 2/292 | 428/75 |
| 3,030,612 A * | 4/1962 | Rubens | H03K 17/84 | 365/171 |
| 3,031,358 A * | 4/1962 | Rutter | F16L 59/026 | 428/75 |
| 3,499,819 A * | 3/1970 | Lewis | C08J 5/124 | 428/317.1 |
| 3,729,879 A * | 5/1973 | Franklin | E04B 1/767 | 52/406.2 |
| 3,837,989 A * | 9/1974 | McCoy | E04C 2/16 | 428/116 |
| 4,073,998 A * | 2/1978 | O'Connor | B32B 15/14 | 442/55 |
| 4,172,345 A * | 10/1979 | Alderman | E04D 3/3602 | 52/406.2 |
| 4,247,583 A * | 1/1981 | Roy | B32B 3/12 | 428/116 |
| 4,294,875 A * | 10/1981 | Schramm | B31F 1/24 | 428/72 |
| 4,300,322 A * | 11/1981 | Clark | E04B 1/762 | 428/121 |
| 4,318,427 A * | 3/1982 | Cross, Jr. | E04B 1/76 | 138/149 |
| 4,385,477 A * | 5/1983 | Walls | E04B 1/7604 | 52/220.1 |
| 4,399,645 A * | 8/1983 | Murphy | E04B 1/7604 | 52/2.11 |
| 4,444,821 A * | 4/1984 | Young | E04B 1/803 | 428/69 |
| 4,675,225 A * | 6/1987 | Cutler | B32B 27/12 | 428/74 |
| 4,700,521 A * | 10/1987 | Cover | B32B 15/14 | 52/404.3 |
| 4,726,974 A * | 2/1988 | Nowobilski | B32B 15/085 | 428/69 |
| 4,726,985 A * | 2/1988 | Fay | B32B 15/14 | 428/138 |
| 4,825,089 A | 4/1989 | Lindsay | | |
| 4,988,406 A * | 1/1991 | Nelson | E04B 1/88 | 156/146 |
| 5,074,090 A * | 12/1991 | Hafers | B65D 81/3858 | 52/406.3 |
| 5,099,629 A * | 3/1992 | Gay | E04B 1/7654 | 428/43 |
| 5,143,245 A | 9/1992 | Malone | | |
| 5,236,754 A * | 8/1993 | McBride | B32B 27/12 | 428/55 |
| 5,277,955 A * | 1/1994 | Schelhorn | B32B 27/12 | 428/74 |
| 5,283,111 A * | 2/1994 | Schlecker | B32B 27/12 | 442/31 |
| 5,362,539 A * | 11/1994 | Hall | B32B 27/12 | 428/68 |
| 5,379,568 A * | 1/1995 | Murray | E04B 1/7604 | 52/406.2 |
| 5,421,133 A * | 6/1995 | Berdan, II | E04B 1/767 | 156/71 |
| 5,475,955 A * | 12/1995 | Dickinson | E04F 11/064 | 182/46 |
| 5,508,079 A * | 4/1996 | Grant | E04B 1/78 | 428/74 |
| 5,545,279 A * | 8/1996 | Hall | B29C 63/044 | 156/201 |
| 5,545,453 A * | 8/1996 | Grant | D04H 3/02 | 428/43 |
| 5,556,682 A | 9/1996 | Gavin et al. | | |
| 5,591,505 A * | 1/1997 | Rusek, Jr. | B32B 1/06 | 428/69 |
| 5,601,897 A * | 2/1997 | Vermilion | E04B 1/803 | 428/69 |
| 5,628,151 A * | 5/1997 | Monat | E04F 11/062 | 182/46 |
| 5,765,318 A * | 6/1998 | Michelsen | E04B 1/7662 | 428/43 |
| 5,792,540 A * | 8/1998 | Hughes | C04B 30/02 | 428/76 |
| 5,817,387 A * | 10/1998 | Allwein | B32B 3/00 | 428/43 |
| 5,826,780 A * | 10/1998 | Neeser | F25D 23/063 | 228/217 |
| 5,848,509 A * | 12/1998 | Knapp | B32B 29/02 | 52/406.2 |
| 5,875,607 A | 3/1999 | Vohra | | |
| 5,918,436 A * | 7/1999 | Alderman | E04B 1/767 | 52/404.1 |
| 5,987,833 A * | 11/1999 | Heffelfinger | E04B 1/767 | 383/211 |
| 6,006,481 A * | 12/1999 | Jacobs | B32B 5/18 | 52/309.9 |
| 6,037,033 A * | 3/2000 | Hunter | B32B 3/04 | 428/72 |
| 6,042,911 A * | 3/2000 | Berdan, II | B32B 5/26 | 428/36.3 |
| 6,083,603 A * | 7/2000 | Patel | E04B 1/767 | 156/204 |
| 6,105,335 A * | 8/2000 | Vohra | E04B 1/7604 | 52/741.41 |
| 6,141,930 A * | 11/2000 | Allwein | E04B 1/767 | 52/404.1 |
| 6,156,086 A * | 12/2000 | Zhang | B01D 39/1623 | 55/382 |
| 6,191,057 B1 * | 2/2001 | Patel | B32B 27/06 | 442/398 |
| 6,223,490 B1 * | 5/2001 | Wessley | E04B 9/003 | 49/463 |
| 6,357,504 B1 * | 3/2002 | Patel | B29C 63/02 | 156/499 |
| 6,403,208 B1 * | 6/2002 | Otaki | E04B 1/767 | 156/285 |
| 6,442,903 B1 | 9/2002 | Hebert | | |
| 6,557,313 B1 * | 5/2003 | Alderman | B32B 7/02 | 52/407.2 |
| 6,793,993 B2 * | 9/2004 | Ray | B32B 27/18 | 428/35.2 |
| 6,797,356 B2 * | 9/2004 | Zupon | B32B 15/20 | 428/131 |
| 6,878,427 B2 * | 4/2005 | Schmidt | D04H 1/54 | 428/71 |
| 7,144,926 B2 * | 12/2006 | Galaton | C08J 9/144 | 521/131 |
| 7,263,810 B1 | 9/2007 | Trauba | | |
| 7,282,252 B2 * | 10/2007 | Fay | B32B 7/00 | 428/137 |
| 7,425,515 B2 * | 9/2008 | Fellinger | B32B 7/02 | 428/457 |
| 7,644,545 B2 * | 1/2010 | Mankell | E04D 13/172 | 52/95 |
| 7,703,253 B2 * | 4/2010 | Lembo | E04B 1/7662 | 52/407.1 |
| 7,770,353 B2 * | 8/2010 | Olsen | E04B 1/80 | 52/745.15 |
| 7,770,691 B2 | 8/2010 | Schabel, Jr. | | |
| 7,780,886 B2 * | 8/2010 | Lembo | B32B 5/26 | 264/113 |

(56) References Cited

U.S. PATENT DOCUMENTS

| | | | | |
|---|---|---|---|---|
| 7,866,105 B2* | 1/2011 | Babbitt | B32B 3/26 | 52/404.1 |
| 7,913,842 B2 | 3/2011 | Evans | | |
| 8,142,584 B2* | 3/2012 | Yang | D04H 1/559 | 156/62.2 |
| 8,161,703 B2* | 4/2012 | Peeters | E04B 1/767 | 52/406.2 |
| 8,309,200 B2* | 11/2012 | Zupon | B32B 15/14 | 428/121 |
| 8,438,789 B2* | 5/2013 | Uhl | E04B 9/003 | 52/19 |
| 8,590,229 B2* | 11/2013 | Taylor | E04F 11/062 | 52/205 |
| 8,931,215 B1* | 1/2015 | Cook | E04B 9/001 | 52/19 |
| 9,598,857 B2* | 3/2017 | Smith | E04B 1/806 | |
| 9,726,438 B2* | 8/2017 | Smith | F28D 20/023 | |
| 10,279,979 B2* | 5/2019 | Ranade | B32B 27/365 | |
| 2002/0040556 A1* | 4/2002 | Weinstein | E04B 1/767 | 52/98 |
| 2002/0114913 A1* | 8/2002 | Weinstein | B32B 3/08 | 428/43 |
| 2002/0136854 A1* | 9/2002 | Smith | B32B 5/26 | 428/43 |
| 2002/0162292 A1* | 11/2002 | Fay | E04B 1/78 | 52/404.1 |
| 2003/0061777 A1* | 4/2003 | Alderman | E04D 13/1625 | 52/407.3 |
| 2003/0129330 A1* | 7/2003 | Alderman | B29C 66/4312 | 428/34.1 |
| 2004/0163345 A1* | 8/2004 | Alderman | E04B 1/7662 | 52/404.1 |
| 2004/0180176 A1* | 9/2004 | Rusek, Jr. | B32B 5/08 | 428/69 |
| 2004/0253406 A1* | 12/2004 | Hayashi | E04B 1/803 | 428/69 |
| 2005/0095936 A1* | 5/2005 | Jones | B32B 5/26 | 442/136 |
| 2006/0037815 A1* | 2/2006 | Schabel | E04B 1/88 | 181/290 |
| 2006/0053559 A1* | 3/2006 | Vantilt | B32B 3/04 | 5/690 |
| 2006/0191058 A1* | 8/2006 | Huza | A41B 9/00 | 2/239 |
| 2007/0012809 A1* | 1/2007 | Fellinger | F16L 11/18 | 241/57 |
| 2007/0054129 A1* | 3/2007 | Kalkanoglu | E04D 5/08 | 428/413 |
| 2007/0094966 A1* | 5/2007 | Snyder | E04D 13/1625 | 52/309.1 |
| 2007/0227530 A1* | 10/2007 | Bayne | A01G 9/1415 | 126/621 |
| 2008/0057334 A1* | 3/2008 | Schroth | C04B 30/02 | 428/615 |
| 2008/0087557 A1* | 4/2008 | Evans | E04F 21/085 | 206/83.5 |
| 2008/0121836 A1* | 5/2008 | Bowman | E04B 1/7604 | 252/62 |
| 2008/0251187 A1* | 10/2008 | Haque | D04H 1/72 | 156/148 |
| 2008/0260303 A1 | 10/2008 | De Lesseux et al. | | |
| 2008/0295434 A1* | 12/2008 | Bills | E04B 1/7654 | 52/506.01 |
| 2009/0019802 A1* | 1/2009 | Crall, Jr. | F16L 59/121 | 52/404.3 |
| 2009/0061147 A1* | 3/2009 | Lippy | B29D 22/02 | 428/76 |
| 2009/0314672 A1* | 12/2009 | Evans | E04F 21/085 | 206/321 |
| 2010/0058672 A1* | 3/2010 | Bayne | A01G 9/241 | 52/2.11 |
| 2010/0058697 A1* | 3/2010 | Wagner | F28D 20/023 | 52/404.1 |
| 2010/0064614 A1* | 3/2010 | Tsu | E04B 1/7604 | 52/404.1 |
| 2010/0107539 A1* | 5/2010 | Martens | E04C 2/386 | 52/506.05 |
| 2011/0146176 A1* | 6/2011 | O'Leary | E04F 21/085 | 52/309.1 |
| 2012/0304860 A1* | 12/2012 | Matson | B01D 46/0005 | 95/273 |
| 2012/0328807 A1* | 12/2012 | Grimes | E06B 5/01 | 428/35.5 |
| 2013/0036692 A1* | 2/2013 | Aspenson | E04B 1/80 | 52/302.3 |
| 2013/0094791 A1* | 4/2013 | Aspenson | E04B 1/78 | 383/211 |
| 2013/0232880 A1* | 9/2013 | Cook | E04B 1/74 | 49/460 |
| 2013/0327705 A1* | 12/2013 | Clark | G10K 11/168 | 210/508 |
| 2014/0360044 A1* | 12/2014 | Smith | F16L 59/065 | 34/468 |
| 2015/0101272 A1* | 4/2015 | Richmond | E04F 11/062 | 52/183 |
| 2015/0218803 A1* | 8/2015 | Rockwell | E04D 13/1625 | 52/404.2 |
| 2016/0052696 A1* | 2/2016 | Cook | E04B 1/7604 | 52/406.2 |
| 2017/0101776 A1* | 4/2017 | White | E04D 13/1637 | |
| 2017/0234005 A1* | 8/2017 | Yuasa | E04B 1/7038 | 52/406.2 |
| 2018/0051460 A1* | 2/2018 | Sollie | E04B 1/7654 | |

OTHER PUBLICATIONS

Schwartz, Alexander; Heat Flow by Radiation in Buildings; Infra Insulation Inc.; Simplified Physics; 1956; 16 pages.

Hall, James A.; Performance Testing of Radiant Barriers; Proceedings of the Third Symposium on Improving Building Systems in Hot and Humid Climates; Arlington, TX, Nov. 18-19, 1986; pp. 57-67.

Levins, W.P. et al.; Cooling Energy Measurements of Houses with Attics Containing Radiant Barriers; Proceedings of the Third Symposium on Improving Building Systems in Hot and Humid Climates; Arlington, TX, Nov. 18-19, 1986; pp. 78-87.

Queer, E. R.; Importance of Radiation in Heat Transfer Through Air Spaces; Presented at the 38th Annual Meeting of the American Society of Heating and Ventilating Engineers, Cleveland, Ohio, Jan. 1932; pp. 77-96.

Swinton, M.C. et al.; Controlling the Transfer of Heat, Air and Moisture Through the Building Envelope; National Research Council Canada; Proceedings, Institute for Research in Construction, Building Science Insight 1990: Small Buildings: Technology in Transition; 1990; pp. 1-18.

Kosny, Jan et al.; Whole Wall Thermal Performance; Oak Ridge National Laboratory; Oak Ridge, TN; 2001; 17 pages.

* cited by examiner

BUILDING INSULATION SYSTEM

CROSS-REFERENCE TO RELATED APPLICATIONS

This application is a Continuation-in-part of U.S. Ser. No. 16/291,853, filed Mar. 4, 2019 which is a Continuation of U.S. Ser. No. 13/652,442, filed Oct. 15, 2012 which claims the benefit of U.S. Provisional Patent Application Ser. No. 61/548,099, filed Oct. 17, 2011, the contents of these applications are hereby incorporated by reference in their entirety.

BACKGROUND OF THE INVENTION

The present invention relates to building construction systems, and particularly to a building insulation system that provides improved insulations for maintaining more moderate temperatures and reducing energy costs.

DESCRIPTION OF THE RELATED ART

Typical building insulation does not have the capacity to provide the full range of thermal barriers against different sources of thermal energy. For insulation to perform as well as possible, the insulation should be able to cope with three forms of thermal transfer, viz., conduction, convention and radiation. The national and worldwide R-values for insulation are generally based upon only one form of heat transfer, viz., conduction. However, conduction only represents approximately 10% of the total thermal forces acting on a building, the remaining thermal forces being approximately 25% for convection and approximately 65% for radiation. Percentages may vary due to the differences in climate zones. Thus, insulation with a high R-value provides excellent thermal break or barrier for conduction, but with no regard to convection and radiation. With about 90% of the thermal energy contributors not being taken into account in typical building insulation, this highlights the extent of thermal inefficiencies existing in homes and other buildings. As a consequence, these inefficiencies contribute to the high costs of heating and cooling a building.

In light of the above, it would be a benefit in the building arts to provide insulation having more efficient thermal protection in order to reduce energy costs. Thus, a building insulation system solving the aforementioned problem is desired.

SUMMARY OF THE INVENTION

The building insulation system includes a reflective, non-porous bag filled with thermal insulation material. The covering of the bag is made from reflective polymeric facer or plastic, which facilitates reflection of thermal energy radiation. The reflective non-porous bag provides a thermal barrier for conduction, convection and radiation aspects of thermal energy transfer.

These and other features of the present invention will become readily apparent upon further review of the following specification and drawings.

DETAILED DESCRIPTION OF THE PREFERRED EMBODIMENTS

Figure 1:
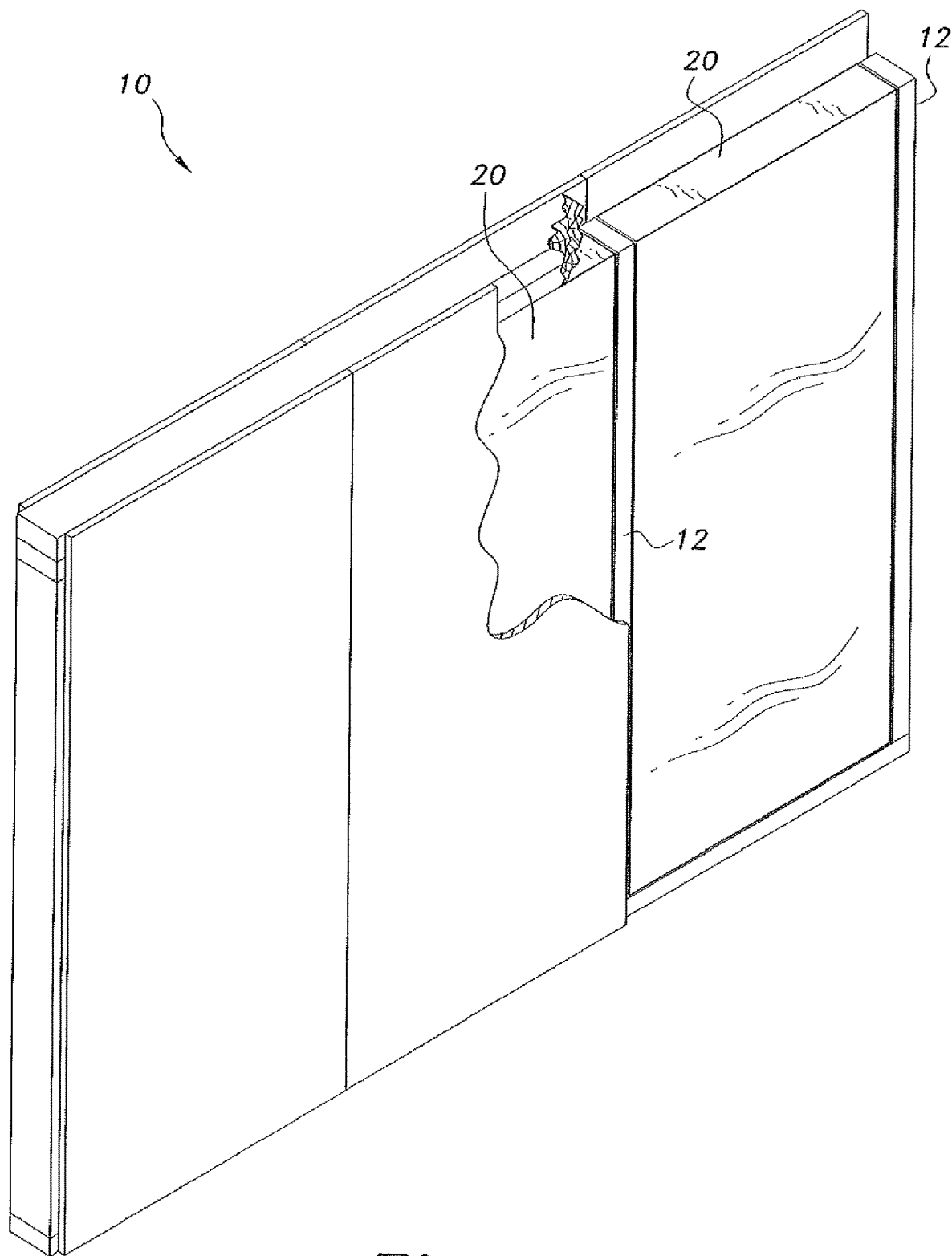
FIG. 1 is an environmental, perspective view of a building insulation system according to the present invention.
Figure 2:
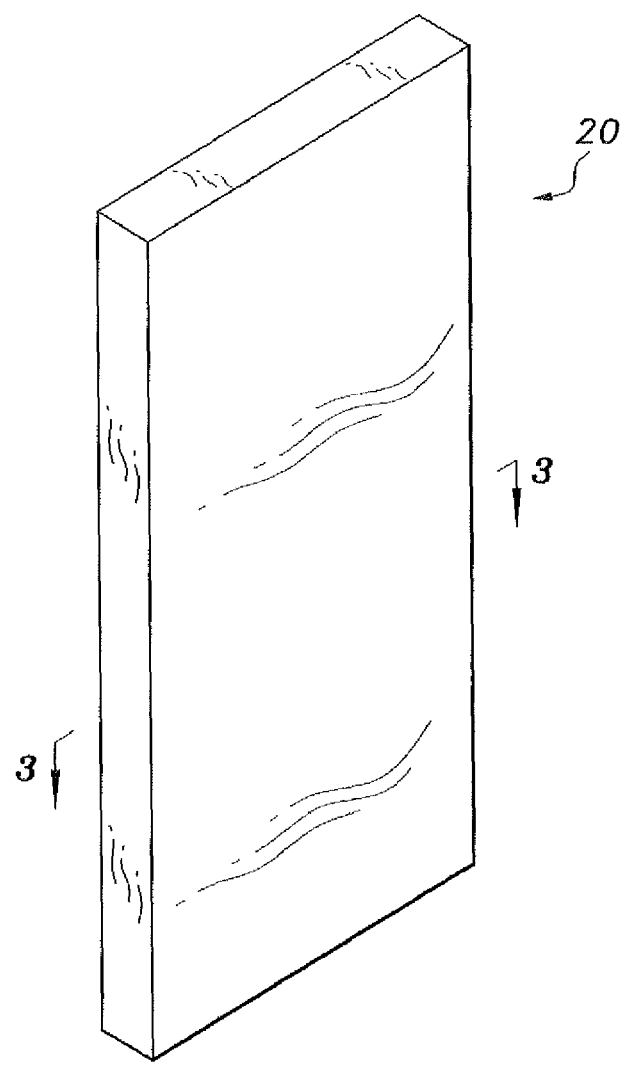
FIG. 2 is a perspective view of a reflective non-porous bag forming a part of a building insulation system according to the present invention.
Figure 3:
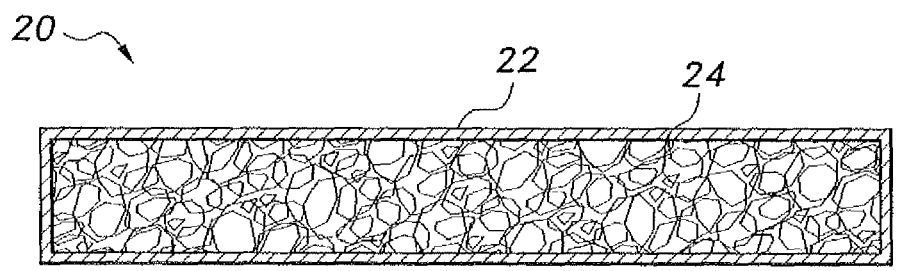
FIG. 3 is a section view drawn along lines 3-3 of FIG. 2.

The building insulation system, generally referred to by the reference number 10, is configured to provide a thermal break for all three forms of thermal energy in a domicile or building. As shown in FIGS. 1-3, the building insulation system 10 includes a reflective, non-porous bag 20 filled with insulation material 24.

In the embodiment shown in the drawings, the covering 22 for the non-porous bag 20 can be made from a reflective polymeric facer or plastic, e.g. polyester or other polymeric sheet material with reflective metal, similar to Mylar® (Mylar is a registered trademark of E.I. du Pont de Nemours and Company of Wilmington, Delaware). The covering 22 completely encapsulates both opposing faces, both opposing sides, and both opposing ends of the bag 20 to provide a non-porous barrier that reflects thermal energy from the surface facing the outer wall or siding, i.e., the surface facing the environment, and also reflects thermal energy from the interior of the domicile. The radiant barrier property of the cover reduces the thermal energy transport through the bag by reducing the emitted radiant energy from the bag. As a consequence, the radiated thermal energy from the interior remains substantially within the domicile, while the radiated thermal energy from the outside is reflected back. Thus, the covering 22 minimizes thermal energy loss within the domicile, which is especially beneficial for heating and reducing the costs thereof. The covering 22 can be provided in single-ply or in multiple-ply construction.

The insulation material 24 can be of any one of, or a combination of, thermal insulation materials selected from fiberglass, cellulose, rockwool, expanded polystyrene, and others. Some of the polystyrene products can be constructed from recycled materials. The insulation material 24 forms a core within the bag 20 that minimizes the conduction aspect of thermal energy transfer. Some insulation materials may produce potential health issues due to fibers, dust, off gassing along with other concerns. However, since the material is sealed within the covering 22, any potential hazards from the insulation material are eliminated or potentially are significantly reduced.

In use, the building insulation system 10 can be installed in substantially the same manner as typical wall insulation. As shown in FIG. 1, each reflective non-porous bag 20 can be provided in standard sizes that fit between adjacent wall studs 12, truss cords and ceiling rafters. The sizes may range from 16 in. to 2 ft. on center (w)×8 ft. (h)×3.5 in. (t), to 16 in. to 2 ft. on center (w)×12 ft. (h)×5.5 in. (t), where "w" refers to the width, "h" refers to the height and "t" refers to the thickness. Shorter and narrow sizes to fit areas under windows, etc. may be provided as desired or needed by the user. Due to the non-porous nature of the bag 20, a complete installation in a domicile or building forms an envelope that helps to prevent thermal energy transfer through convection.

There is a problem with loose-fill fiberglass attic insulation in cold climates. It appears that, as attic temperature drops below a certain point, air begins to circulate into and within the insulation, forming "convective loops" that increase heat loss and decrease the effective R-value. At very cold temperatures (−20 F), the R-value may decrease by up to 50%. In full-scale attic tests at Oak Ridge National Laboratory, the R-value of 6 inches of cubed loose-fill attic insulation progressively fell as the attic air temperature dropped. At −18 F, the R-value measured only R-9. The problem seems to occur with any low-density, loose-fill fibrous insulation.

Figure 4:
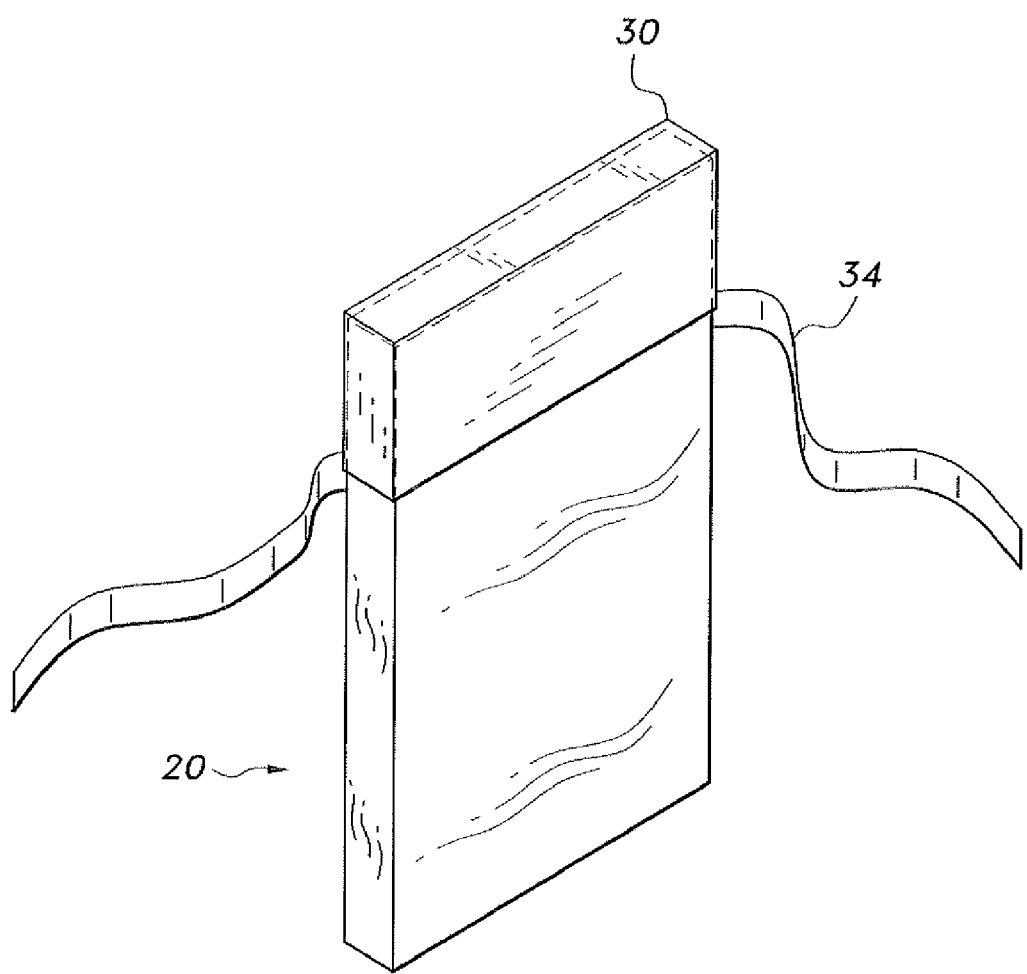
FIG. 4 is a perspective view of a reflective non-porous bag forming part of a building insulation system according to the present invention, shown with sealing material being applied when the bag is cut to size during installation.
Figure 5:
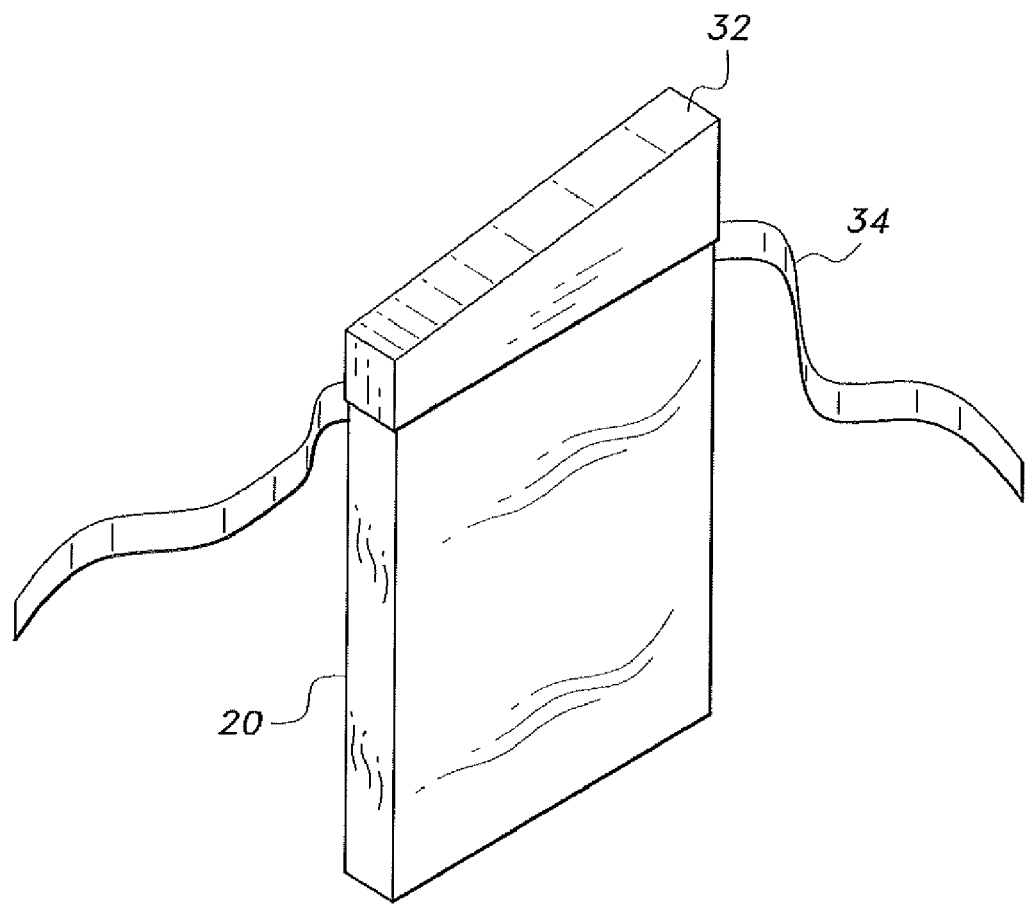
FIG. 5 is a perspective view of a reflective non-porous bag forming part of a building insulation system according to the present invention, shown with sealing material being applied to an angled or beveled cut end of the bag.

Referring to FIGS. 4 and 5, these figures show how to maintain the non-porous characteristic of the bag 20 in the event one or both of the ends have to be cut to size and/or shape. In general, it is often necessary to cut insulation down to size and/or shape the same during installation of the insulation. However, this practice would compromise the non-porous integrity of the bag 20. In order to insure that the bag 20 is sealed, a wrap 30 in the shape of a cap or sleeve can be provided to fit the cut end of the bag 20, thereby capping the cut end of the bag 20. Then the cap is sealed with adhesives or by tape 34. An alternative wrap 32 can be used for angled or beveled cut ends, such as for insulation on the rafters, ceilings and gables. The wraps 30, 32 are preferably of the same construction as the reflective, non-porous bag 20.

In another example of fills and cuts the bag close to size and fold over tape is applied to the cut end to seal the cut end (straight or angle) of the bag and then folded to fit the opening and the bag is taped to that shape. If needed, to change the width, the bag could be folded before filling and taped to maintain the correct width during filling.

Another example is to have an open or partially closed (on large widths) bag which would be sealed in the same manner as the cut bags. This would greatly reduce the complexity and cost of the system.

Figure 6:
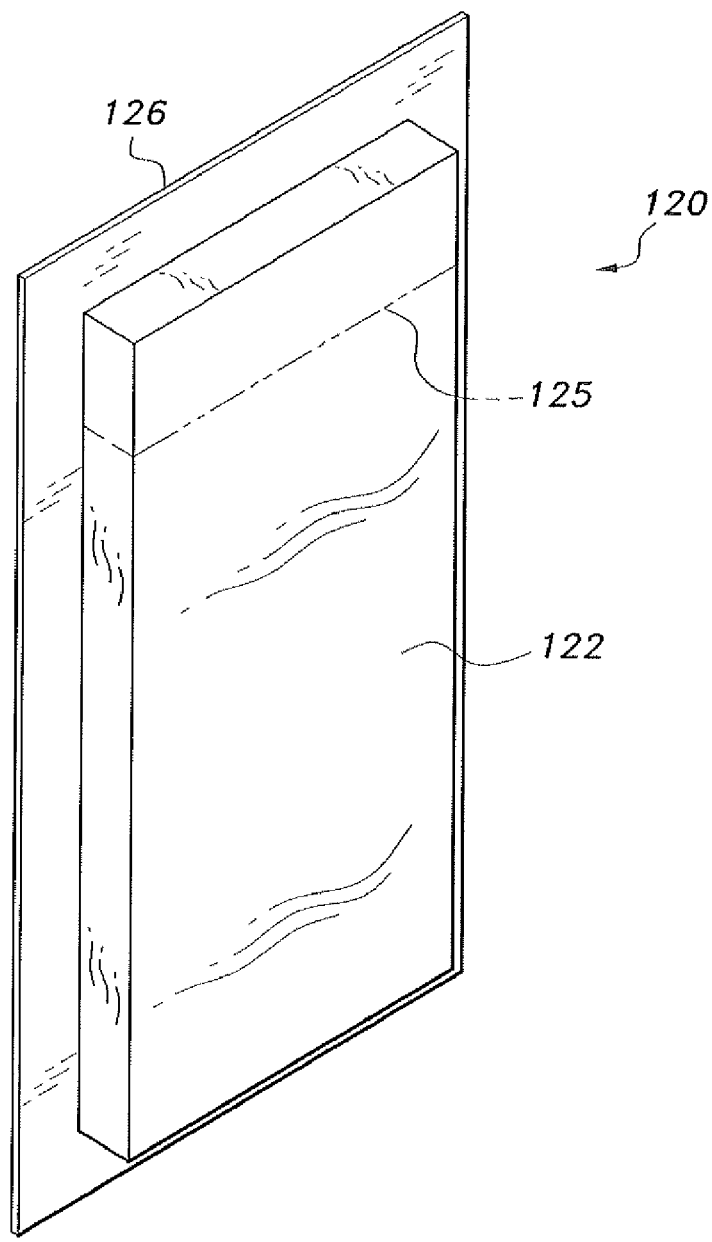
FIG. 6 is a perspective view of an alternative embodiment of a reflective non-porous bag forming a part of a building insulation system according to the present invention, the bag having a cover tab.
Figure 7:
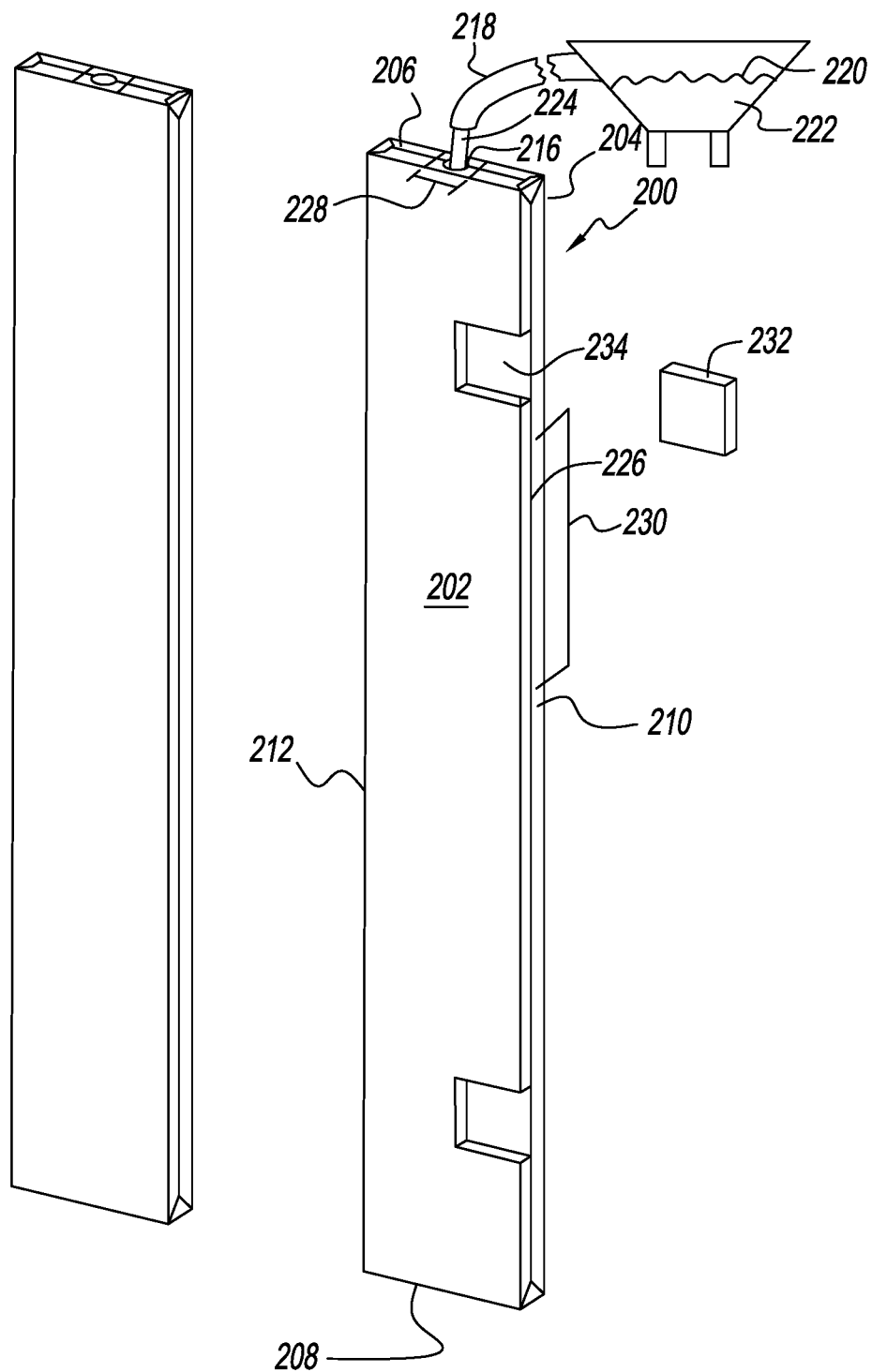
FIG. 7 is a perspective view of a bag insulation system.
Figure 8:
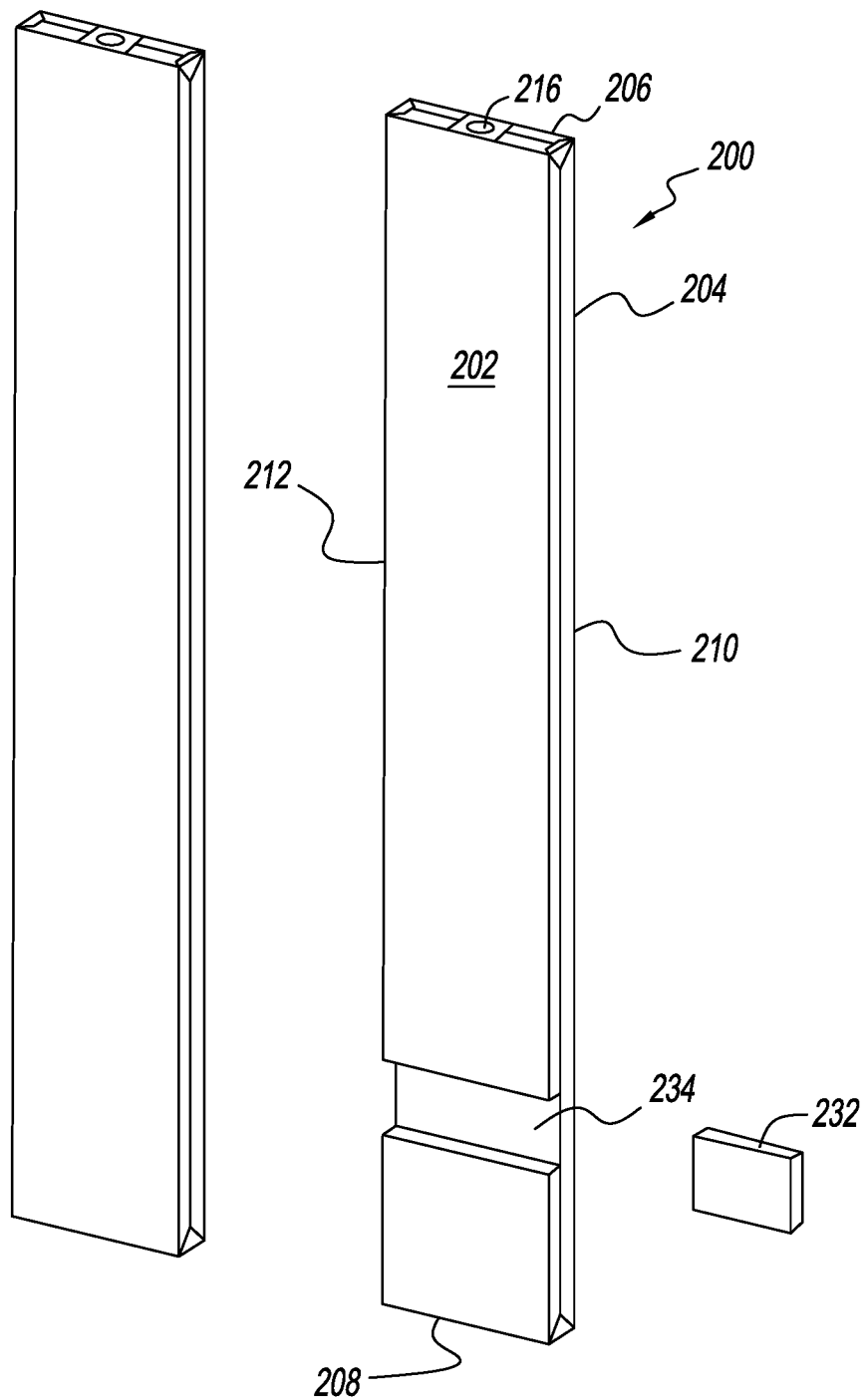
FIG. 8 is a perspective view of a bag insulation system.

An alternative embodiment of a reflective, non-porous bag 120 is shown in FIG. 6. In this embodiment, the bag 120 is configured to provide a continuous moisture/vapor barrier behind the interior wall. This type of protection can be necessary in some areas where building codes require a moisture/vapor barrier behind the interior wall and not at the exterior wall, or in retrofit installations where there is no moisture/vapor barrier in the wall assembly. Between 50% and 75% of the effective thermal resistance of porous insulation is lost if the system allows vapor transfer from one side of the cavity to the other. As shown, the bag 120 includes an outer covering 122 filled with insulation material 24 in substantially the same manner as the previously described bag 20. In addition, the bag 120 includes a surrounding cover tab or flange 126. The cover tab 126 can be constructed from the same reflective and non-porous material as the covering 22 or outer covering 122. In use, the cover tab 126 overlaps or covers the adjacent studs 12 and the headers and footers of a wall assembly on the side of the interior wall to thereby provide a moisture/vapor barrier. As with the bag 20, the bag 120 can be cut to size, e.g., as the cut line 125 shown in FIG. 6, and resealed with cap 30, 32 and tape 34.

The cover tab 126 can be provided in several ways. For example, the cover tab 126 can be an integral face side of the overall bag 120, i.e., the cover tab 126 can be constructed by outwardly extending one of the face sides of the covering 122. In another example, the cover tab 126 can extend from the sides, i.e., the top, bottom and lateral sides of the bag 120. In a still further example, the cover tab 126 can be a separate sheet adhered to or attached to one of the faces of the bag 120.

Thus, it can be seen that the thermal insulation properties of the building insulation system 10 counteracts conduction, convection and radiation aspects of thermal energy transfer. The non-porous insulated envelop in a domicile maintains moderate interior temperatures at a comfortable level with minimal heating/cooling energy expenditure and costs. Moreover, the non-porous nature of the bag 20, 120 helps to prevent moisture from condensing in the insulation. The Canadian Research Council states moisture can reduce the performance of porous insulation as much as 50-70&.

In another embodiment, a bag 200 has a front or first surface 202, a back or second surface 204, a first end 206, a second end 208, a first side 210, and a second side 212 that form a hollow compartment 214. The bag 200 has an inlet port 216 preferably located at the first end 206. The inlet port 216 is adapted to receive a hose 218 from a hopper machine 220 that is filled with insulation material 222. The insulation material 222, which is blown into the bag 200, preferably at a job site, includes cellulose, fiberglass, hemp fiber, or the like. In one example, the insulation material 222 includes a high performance, rigid insulation consisting of a superior closed-cell lightweight and resilient expanded polystyrene (EPS) with advanced metallic polymer facers and/or white woven facers. When tested with wood, steel, and concrete assemblies the insulation material achieved the following results:

| | Effective R-Value |
|---|---|
| Test Results | |
| 1" Thermal 3Ht - product R-value (no construction materials) Wood Frame Assemblies/wall construction details | 5.86 |
| Oakridge National Laboratory/US Department of Energy claims the whole wall R-value of R-19 fiberglass insulation, 2 × 6 (16" O.C.) wood frame wall as commonly installed | R-13.7 or 26% less than labeled R-value |
| ½" Sheetrock, 2" × 4" Studs, Empty Cavity, 7/16" OSB, 1" Thermal 3Ht | 8.3 |
| ½" Sheetrock, 2" × 4" Studs, Empty Cavity, 7/16" OSB, ¾" Strapping, 1" Thermal 3Ht | 10.6 |
| ½" Sheetrock, Vapor Retarder, 2" × 4" Studs, R-11 Batts, 7/16" OSB, 1" Thermal 3Ht | 18.0 |
| ½" Sheetrock, ¾" Strapping, ¾" Thermal 3Ht, 2" × 4" Studs with R-11 Batts, 7/16" OSB | 19.5 |

| | Effective R-Value |
|---|---|
| ½" Sheetrock, 2" × 6" Studs with R-19 Batts, 7/16" OSB, ¾" Strapping, 1" Thermal 3Ht | 26.3 |

*R-19 fiberglass insulation would enhance the effective R-value of preceding R-11 fiberglass assemblies by approximately R-6.

| Steel Frame Assemblies/wall construction details | Effective R-Value |
|---|---|
| (ASHRAE)/American Society of Heating, Refrigerating and Air-conditioning Engineers states the effective R-value of R-19 fiberglass insulation, 2" × 6" (16" O.C.) steel frame wall | R-7.1 or 62% less than labeled R-value |
| Steel Sheathing Interior, 2" × 6" Steel Stud Frame, Empty Cavity, Horizontal 2" × 4" Steel Studs (Simulates Steel Girts), ½" Thermal 3Ht, Exterior Steel Sheathing | 5.22 |
| Steel Sheathing Interior, 2" × 6" Steel Stud Frame, Empty Cavity, Horizontal 2" × 4" Steel Studs (Simulates Steel Girts), 1" Thermal 3Ht, Exterior Steel Sheathing | 6.85 |
| Steel Sheathing Interior, 2" × 6" Steel Stud Frame, ½" Thermal, R-19 Fiberglass Batt squeezed between 2" × 4" Steel Studs (Simulates Steel Girts) and Exterior Steel Sheathing | 14.77 |

| Concrete Assemblies/wall construction details | Effective R-Value |
|---|---|
| As tested to ASTM C1363-05 - the effective R-value of a concrete wall assembly containing ½" sheetrock, vapor retarder, 6" steel studs (16" O.C.), R-19 fiberglass, 3.5" concrete wall | R-11 or 39% less than labeled R-value |
| 3.5" concrete wall, ½" Thermal 3Ht adhered to the outside (cold side) of wall | 3.8 |
| 3.5" concrete wall, 1" Thermal 3Ht adhered to the outside (cold side) of wall | 5.9 |
| ½" sheetrock, empty 6" steel stud cavity, 1" thermal 3Ht (warm side), 3.5" concrete wall | 9.8 |
| ½" sheetrock, 6" steel stud cavity with R-19 fiberglass, 1" thermal 3Ht, 3.5" concrete wall | 21.6 |

The insulation material, which produced an effective R-Value of 5.86, was tested at a temperature range of 70 degrees F. (warm side) to 0 degrees F. (cold side) and was conducted to determine the effective R-value of wall assemblies in predominately heating climates. From the test it was determined that the location of the insulation material affected the overall R-value of the assembly. Further, the greater the thickness of the insulation material, the more effective the insulation is as indicated in the increased R-value.

Alternatively, an extension tube 224 is attached to the hose 218. The extension tube 224 has a diameter smaller than the diameter of the inlet port 216 to allow transport air to escape around the extension tube 224. Preferably, the inlet port 216 has a diameter of about three inches while the extension tube 224 has a diameter of between two to two-and-a-quarter inches. As another option, a vent 226 made of mesh or perforations is incorporated into one of the sides or ends of the bag 200. The inlet port 216 has a cover 228 which is of any type and can include a peel and stick flap. Likewise, the vent 226 has a cover 230 which also can include a peel and stick flap.

The inner surface 202 of the bag 200 has one or more removable members 232 that form an indentation 234. The indentations, in particular, are positioned to align with outlet gang boxes within a structure (not shown). In one example, the indentations 234 are spaced along the inner surface 202 and extend from the second side 212 toward the opposite side 210. In this example, ends 206 and 208 can be reversed so that the indentations 234 are likewise reversed. In another example, the indentation extends across the bag 200 from the first side 210 to the second side to accommodate an outlet gang box and stud.

The size of the bag 200 can be adjusted by folding over an end 206 or 208 and/or a side 210 or 212 and securing or sealing the end or side in position. This permits the traditional bag to fit post and frame buildings and a thermal break bag with lip to cover the lower truss cords or ceiling joists. The depth of the bag 200 is adjusted to cover code changes. Also, the bag 200, using less insulation, is shaped around electrical outlets, light units, can lights, HVAC duct work, registers, and the like. Also, like the other embodiments the bag 200 has a cover made of reflective material.

It is to be understood that the building insulation system 10 encompasses a variety of alternatives. For example, the bag 20, 120, and 200 can be provided in a variety of different custom shapes to fit various architectural designs. Moreover, select locations thereof can be perforated as deemed necessary by the user to provide limited breathability.

It is to be understood that the present invention is not limited to the embodiments described above but encompasses any and all embodiments within the scope of the following claims.

What is claimed is:
1. A building insulation system, comprising:
   a bag having a first and a second surface, a first and a second end, and a first and a second side that form a hollow compartment;

an inlet port at the first end of the bag;

the hollow compartment filled with an insulation material;

a hose extending from a hopper machine is connected to the inlet port; and an extension tube connected between the inlet port and the hose, wherein the extension tube has a diameter smaller than a diameter of the inlet port so that transport air is allowed to escape around the extension tube;

the first surface has at least one removable member that forms an indentation; and the indentation is configured to align with an outlet gang box of a structure.

2. The system of claim 1 wherein the indentation extends from the first side towards the second side.

3. The system of claim 1 wherein the indentation extends across the bag from the first side to the second side.

4. A building insulation system, comprising:

a bag having a first surface and a second surface, a first end and a second end, and a first side and a second side that form a hollow compartment;

an inlet port having a first removable cover at the first end of the bag;

a hose having an extension tube, wherein the extension tube is inserted into the bag and having a diameter that is smaller than a diameter of the inlet port such that air is permitted to escape from the hollow compartment of the bag between the inlet port and the extension tube;

the bag having at least one removable member that forms an indentation.

5. The system of claim 4 wherein the indentation is configured to align with an outlet gang box of a structure and extends from a group consisting of from the first side towards the second side, and across the bag from the first side to the second side.

6. The system of claim 5 further comprising a vent incorporated into the bag and having a second removable cover, wherein the vent is made of a perforated material, and the first removable cover and the second removable cover are a peel and stick.

7. The system of claim 6 further comprising the hollow compartment filled with the insulation material, wherein the insulation material includes a material selected from a group consisting of cellulose fiberglass, hemp fiber, and a superior closed-cell lightweight and resilient expanded polystyrene with advanced metallic polymer facers.

* * * * *